C. H. LANGILL.
SELF OILING SHEAVE.
APPLICATION FILED JAN. 17, 1916.
1,180,509.
Patented Apr. 25, 1916.
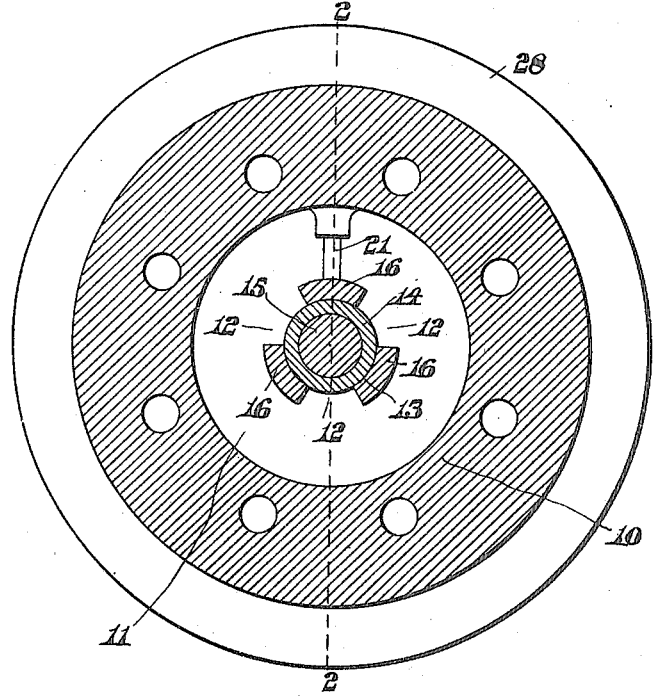
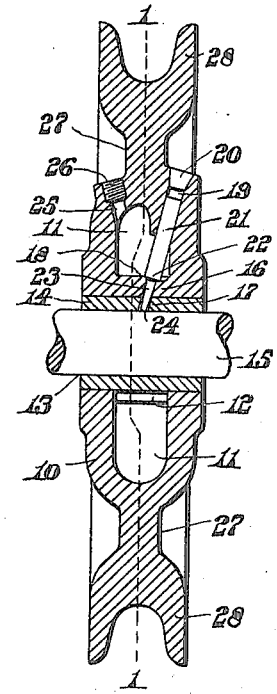
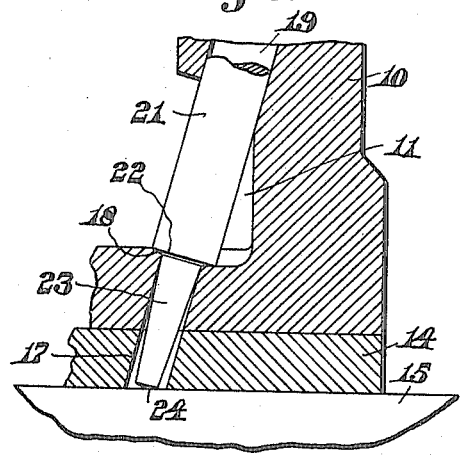
Inventor:
Charles H. Langill,
by Walter E. Lombard,
Atty.

UNITED STATES PATENT OFFICE.

CHARLES H. LANGILL, OF BOSTON, MASSACHUSETTS.

SELF-OILING SHEAVE.

1,180,509.  Specification of Letters Patent.  Patented Apr. 25, 1916.

Application filed January 17, 1916.   Serial No. 73,063.

*To all whom it may concern:*

Be it known that I, CHARLES H. LANGILL, a citizen of the United States of America, and a resident of Boston, in the county of Suffolk and State of Massachusetts, have invented certain new and useful Improvements in Self-Oiling Sheaves, of which the following is a specification.

This invention relates to self-oiling sheaves and has for its object the provision of a device of this character which will be simple in construction and effective in operation.

The invention consists of a sheave having an annular oil chamber surrounding its central bore and provided with a reciprocable plunger which is adapted at each rotation of said sheave to force a limited amount of oil from said oil chamber to the surface of the pin or shaft on which said sheave is adapted to rotate.

The invention further consists in certain novel features of construction and arrangement of parts which will be fully understood by reference to the description of the drawings and to the claims hereinafter given.

Of the drawings: Figure 1 represents a section of a sheave embodying the principles of the present invention, said section being on line 1, 1 on Fig. 2. Fig. 2 represents a transverse section of the same on line 2—2 on Fig. 1, and Fig. 3 represents an enlarged sectional detail to be hereinafter referred to.

Similar characters designate like parts throughout the several figures of the drawings.

In the drawings, 10 is the hub of a sheave having an annular oil chamber 11 therein, connected by the spaced passages 12 with the central opening 13 extending through said sheave and in which is positioned the hardened bushing 14 adapted to receive the pin 15 on which said sheave is adapted to rotate.

Between the passages 12 are the ribs 16 equidistant apart. Through one of these ribs 16 and the bushing 14 extends an inclined hole 17, the inner end of which communicates with the bore of said bushing 14 at a point midway of its length while its outer end terminates in a seat 18 within the oil chamber 11. The outer wall of said oil chamber 11 is provided with a recess 19 alined with said hole 17, said recess 19 being formed by drilling a hole through the wall of said chamber 11 and then permanently closing said hole by the plug 20 driven tightly therein.

In the recess 19 is positioned the outer end of a cylindrical plunger 21 having a shoulder 22 normally on the seat 18, while its outer end is a slight distance from the inner end of the plug 20 which serves as a limiting stop for the outward movement of said member 21. The inner end of the plunger 21 is provided with a reduced tapered end 23 the length of which is equal to the length of said hole 17. The reduced end 23 terminates in a cone-shaped end 24, one line of the surface of which is always in alinement with the upper wall of the bore of the bushing 14 when the shoulder 22 of the valve member 21 is on its seat 18. It is obvious, therefore, that a portion of the cone-shaped end 24 will be in contact with the pin 15, and as the sheave rotates, the member 21 will be at times rotated about its axis, thus keeping the seat 18 and its coacting shoulder 22 in operative condition at all times. If the cone-shaped end 24 becomes worn from contacting with the pin 15, the shoulder 22 will also become worn an equal amount so that the length of the tapered end 23 will always be maintained a length equal to the length of the hole 17 in which it is positioned. The hub 10 is provided with a passage 25 closed by a threaded plug 26, the passage being used to fill the chamber 11 with oil.

As it is desirable that the plunger 21 should be on its seat when the chamber 11 is filled, the passage 25 is located on the opposite side of the sheave from the recess 19 and in the same radial plane therewith. When the chamber 11 has been filled with oil and the sheave is rotated on the supporting pin or shaft 15, it is obvious that when the plunger reaches a point beneath said pin it will move endwise until its end comes in contact with the end of the plug 20. This action will remove the shoulder 22 from the seat 18 and permit the oil to enter the hole 17, and as the sheave continues to rotate, the plunger 21 will return to its normal position forcing a portion of the oil into contact with the pin or shaft 15.

As the reduced end 23 and the hole 17 are of equal length, the reciprocatory movement of the plunger 21 will prevent the hole 17 from becoming clogged by any impurities or sediment in the oil. In other words, the hole 17 is cleared out at every cycle of the sheave and during each cycle an equal amount of oil from the chamber 11 is forced through the hole into contact with the periphery of the supporting member 15. The hub 10 is connected by the usual web 27 to the grooved rim 28. This sheave is particularly adapted for use on derricks and similar machines where the sheaves are located in more or less inaccessible places, for when the chamber 11 has been once filled with oil the oiling of the bearing parts will be automatically performed, and owing to the limited amount of oil used the oil in said chamber will last for many months before refilling is required.

It is believed that the operation and many advantages of this invention will be fully understood from the foregoing description.

Having thus described my invention, I claim:

1. A sheave having an annular oil chamber surrounding its bore; a hole from said oil chamber to said bore; a recess in the wall of said chamber opposite to and in alinement with said hole; and a cylindrical plunger with its outer end in said recess and having a reduced inner end positioned in said hole, said plunger being adapted to reciprocate during the rotation of said sheave.

2. A sheave having an annular oil chamber surrounding its bore; a hole from said oil chamber to said bore; a recess in the wall of said chamber opposite to and in alinement with said hole; and a cylindrical plunger with its outer end in said recess and having a reduced tapered inner end positioned in said hole, said plunger being adapted to reciprocate during the rotation of said sheave.

3. A sheave having an annular oil chamber surrounding its bore; a hole from said oil chamber to said bore; a recess in the wall of said chamber opposite to and in alinement with said hole; and a cylindrical plunger with its outer end in said recess and having a reduced inner end positioned in and of the same length as said hole, said plunger being adapted to reciprocate during the rotation of said sheave.

4. A sheave having an annular oil chamber within its hub and surrounding its bore; a hole extending from said bore to said chamber; a recess in the wall of said chamber alined with said opening, with its outer end terminating in a plane between the outer faces of said hub; and a cylindrical plunger with its outer end in said recess and provided with a reduced inner end extending the full length of said hole when the inner end of the body of said plunger is on its seat, said plunger being adapted to reciprocate during the rotation of said sheave.

5. A sheave having an annular oil chamber within its hub and surrounding its bore; an inclined hole extending from said bore at a point midway of its length to said chamber; an inclined recess in the wall of said chamber alined with said hole; and a reciprocable cylindrical plunger with its outer end positioned in said recess and its inner end provided with a tapered end positioned in said hole.

6. A sheave having an annular oil chamber within its hub and surrounding its bore; an inclined hole extending from said bore at a point midway of its length to said chamber; an inclined recess in the wall of said chamber alined with said hole; a reciprocable cylindrical plunger with its outer end positioned in said recess and its inner end provided with a tapered end positioned in said hole; and means on said sheave located opposite to said recess whereby said chamber may be filled with oil.

7. A sheave having an axial opening and an annular oil chamber within its hub communicating with said opening by a plurality of spaced passages separated by ribs connecting the opposite side walls of said chamber; a bushing in said axial opening; alined holes in one of said ribs and said bushing; a recess in the outer wall of said chamber in alinement with said hub and bushing holes; and a reciprocable cylindrical plunger with its outer end in said recess and having a reduced inner end positioned in said holes in said rib and bushing.

8. A sheave having an annular oil chamber within its hub and surrounding its bore; an inclined hole extending from said bore to said chamber; an inclined recess in the wall of said chamber alined with said hole; and a reciprocable plunger with its outer end in said recess and having a reduced portion in said hole terminating in a cone-shaped end, one portion of the surface of which is normally in alinement with the wall of the bore of said sheave.

Signed by me at 4 Post Office Sq., Boston, Mass., this 13th day of January, 1916.

CHARLES H. LANGILL.

Witnesses:
 WALTER E. LOMBARD,
 NATHAN C. LOMBARD.